April 9, 1935.  H. JUNKERS  1,997,383
CALORIMETER
Filed July 6, 1931
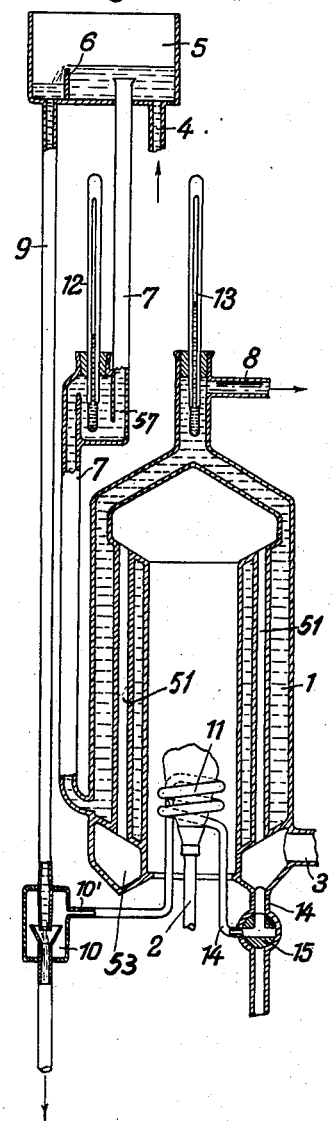
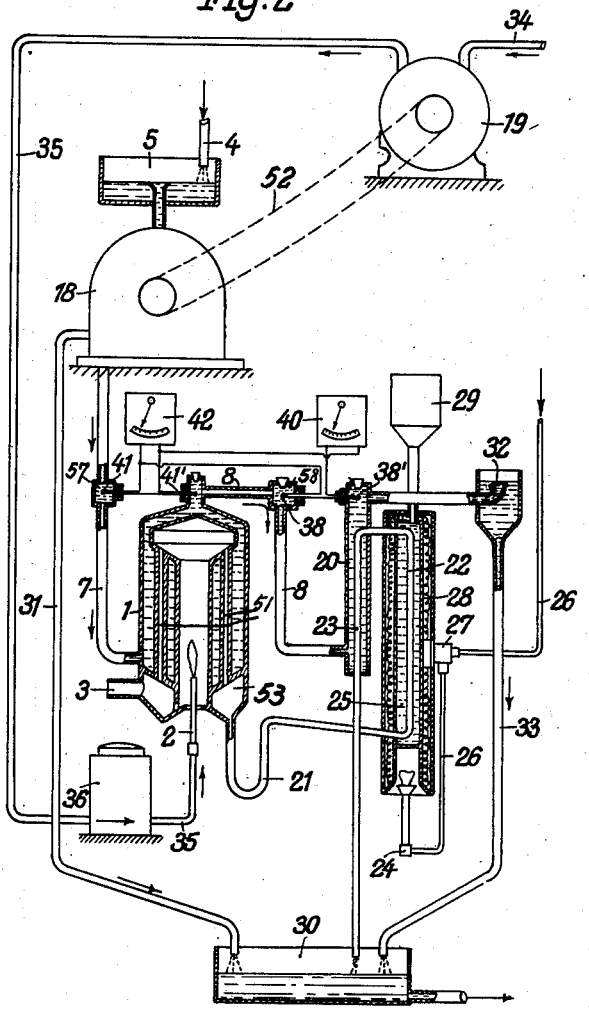
Inventor:
Hugo Junkers
by Karl Liekatein
Atty.

Patented Apr. 9, 1935

1,997,383

UNITED STATES PATENT OFFICE 1,997,383

CALORIMETER

Hugo Junkers, Dessau, Germany

Application July 6, 1931, Serial No. 548,942
In Germany July 14, 1930

13 Claims. (Cl. 73—184)

My invention relates to calorimeters and more particularly to calorimeters of the liquid-flow type in which the heating value of fuels is ascertained by continuous combustion and the rise in the temperature of the flowing liquid, usually water, is a measure for the heating value of the fluids. It is an object of my invention to design a calorimeter of the type referred to for ascertaining the net heating value of fuels, i. e. the total heating value, minus the heat for evaporating the water of combustion. Water vapor invariably forms upon the combustion of gases which contain free or combined hydrogen. If the hot products of combustion are cooled down to the ambient temperature, the water vapor is condensed, the heat of condensation is liberated and the total amount of heat delivered by the products of combustion is equal to the heat delivered by the gaseous constituents plus the heat of condensation. However, in the operation of furnaces by the combustion of gas, the products of combustion are purposely not cooled until the water vapor is condensed, as the condensate would corrode the heating surfaces, and therefore opinions differ as to whether calculations of economy for furnaces should be based on the total heating value or on the net heating value. The argument in favor of the total heating value is that it is more scientific because the maximum heat extraction is that in which the gases are cooled to the ambient temperature. On the other hand, it is argued in favor of the net heating value, that in the actual operation of a furnace the products of combustion are never cooled to the ambient temperature, for the reason stated. In view of this difference of opinions as to which heating value should be ascertained, it is desirable to provide, in addition to the old calorimeters for directly ascertaining the total heating value, a calorimeter in which the net heating value is ascertained rapidly, continuously and exactly.

In reducing my invention to practice, I provide means for effecting a flow of liquid, usually water, in heat-exchange relation to the products of combustion and for measuring the temperatures at the inlet and at the outlet for the liquid as in the normal operation of calorimeters, but according to my invention I provide means for re-evaporating the water of combustion which has condensed from the products of combustion after they have given up their heat to the liquid in the heat exchanger. The re-evaporation of the condensate may be effected by heat extracted from the products of combustion or by a separate source of heat. If the heat for re-evaporating the condensate is extracted from the products of combustion, for instance by providing a heating coil for the condensate in the immediate vicinity of the test flame, the amount of heat which is effective on the heat exchanger and is measured by the temperature gradient from the inlet to the outlet of the cooling medium, is the total heating value minus the heat recovered therefrom for re-evaporating the condensate.

Instead of re-evaporating the condensate by heat from the test flame, i. e., by heat supplied to the calorimeter by the fuel under test, I may re-evaporate the condensate by means of heat from a foreign source and recondense the steam by means of the flowing liquid on its way to, or on its way from, the calorimeter. The temperature of the flowing liquid is obviously increased by the heat liberated during re-condensation and the amount of heat corresponding to this increase of temperature is the heat recovered by the evaporation of the condensate which subtracts from the total heating value so that the net heating value is the result.

Normally the temperature gradient is measured directly, for instance by means of an air thermometer, but it may also be measured indirectly by means of thermocouples, resistance thermometers and the like.

In an apparatus having a foreign source of heat two sets of thermocouples may be provided, the first set measuring the heat of combustion corresponding to the total heating value, the second set being influenced by the temperatures of the flowing liquid at the inlet and at the outlet of the condenser for re-condensing the evaporated water of combustion. The two sets of thermocouples are connected in opposite relation and the difference between their voltages indicates the net heating value.

The foreign source of heat involves a somewhat higher initial cost of the apparatus than the re-evaporation of the condensate by the partly recovered heat of the tested fuel itself, but it presents the advantage that the total and net heating values are ascertained simultaneously and may be indicated or recorded side by side. From such records important hints concerning the composition of the fuel under test may be deduced.

In the drawing affixed to this specification and forming part thereof two calorimeters embodying my invention are illustrated diagrammatically by way of example.

In the drawing

Fig. 1 is a sectional elevation of a calorimeter in which the condensate is evaporated by the test flame, i. e., by heat recovered from the fuel itself, and Fig. 2 is a partly sectional elevation of a calorimeter in which a separate source of heat is provided for evaporating the condensate.

Referring now to the drawing and first to Fig. 1, the heat exchanger 1 of the calorimeter is heated by the flame of a burner 2 to which fuel, in the present instance, gas, is supplied. The gases of combustion give up their heat to the flowing liquid, normally water, in the heat exchanger, rising in its central flue and returning through tubes 51. 53 is an annular collector at the lower end of the heat exchanger, which receives the condensate from the tubes 51, and from which the gases of combustion are discharged by a chimney flue 3.

5 is a reservoir for the water which flows in the heat exchanger 1, 4 is a supply pipe connected to the reservoir, 7 is a down-flow pipe, with an enlarged casing 57 and a thermometer 12, extending from the reservoir 5 to a point near the bottom of the heat exchanger, 8 is the discharge pipe for the water at the upper end of the calorimeter, and 13 is a thermometer connected to this pipe.

6 is a weir in the reservoir 5, 9 is a downflow pipe for the reception of the water overflowing the weir, and 10 is an aspirator which is connected to the collector 53 through a pipe 10', a coil 11 which is heated by the flame of the burner 2, a pipe 14 connecting the coil 11 to the bottom of the collector 53, and a three-way cock 15 in the pipe 14 which also serves for draining the condensate. Water is continuously supplied to the reservoir 5 through the pipe 4, descends to the heat exchanger 1 through the downflow pipe 7 and is discharged through the pipe 8. In this manner, a continuous flow of liquid through the exchanger 1 is established. A portion of the water in the reservoir 5 flows over at the weir 6 and operates the aspirator 10. Under the suction of the aspirator, the condensate from the collector 53 flows to the coil 11 through the pipe 14 and the three-way cock 15 and is evaporated in the coil. The vapor from the condensate flows to the aspirator 10 through pipe 10' and is condensed by the water descending in the pipe 9.

By evaporating the condensate in the coil 11 the heat for the evaporation of the condensate subtracts from the total heat of the products of combustion so that now only the amount of heat corresponding to the net heating value is given off to the water in the heat exchanger 1. The difference between the indications of the thermometers 12 and 13 at the inlet and at the outlet of the water, multiplied with the quantity of water flowing through the calorimeter per unit of fuel, is a measure for the net heating value. If it is desired to ascertain the total heating value the condensate is drained from the collector 53 through the three-way cock 15.

The pipe 14 is a siphon in which forms a liquid seal of condensate, so that gas is not drawn into the aspirator 10. The suction of the aspirator 10 is chosen slightly above the minimal value required for raising the condensate from the bottom of the collector 53 to the evaporator 11. In order, however, to avoid sucking of the whole liquid from the collector 53 causing a sucking in of the gases of combustion alone, the pipe 14 is formed as a loop, the length of the shanks of which is chosen in such a manner that the aspirator cannot suck the entire liquid from the collector 53. Since a sucking force of the aspirator, equivalent to a few centimetres of head of water, is sufficient, the shanks require merely a length of a few centimetres. Preferably the loop is made as short as possible in order to avoid a lagging of the indication due to the contents of liquid in the loop. Even if accidently gas is drawn into the aspirator 10, this will not influence the test result to any appreciable extent as the heat which this gas can absorb, is practically nil as compared with the heat required for evaporating the condensate in the coil 11. The specific heat of the gas is only about 1/2 000 000 of the evaporation heat of water related to equal volumes. Assume, for instance, that equal volumes of gas and water are admitted to the evaporator, and that the gas and the water are heated to about 100°, one cubic centimetre of water absorbs about $600/1000 = .6$ calories for evaporation, while one cubic centimetre of gas absorbs $(.3 \times 100)/1\,000\,000 = .00003$ calories, the coefficient .3 being the specific heat of one cubic metre of gas. The gas, consequently, absorbs only 1/20 000 of the heat absorbed by the evaporated water, so that, even if some bubbles of gas are accidentally entrained, the result will not be appreciably influenced thereby.

In Fig. 2 the heat exchanger 1, the burner 2, and its other accessories are designed as described with reference to Fig. 1, and the products of combustion are carried away from the annular collector 53 through the flue 3. 18 is a water meter below the reservoir 5, with an outflow pipe 31, and 19 is a gas meter which is connected to the water meter by suitable positive means such as a sprocket chain 52, so as to maintain constant the ratio of gas and water. The water from the water meter 18 flows to the heat exchanger through pipe 7 and casing 57. The thermometers 12 of pipe 7, and 13 in the discharge pipe 8, are here replaced by a thermoelectric system having a thermocouple 41 in the casing 57 where it is under the influence of the cold water flowing in the pipe 7, and another thermocouple 41' in the flow of the heated water through the discharge pipe 8. 42 is a galvanometer to which the couples 41, 41' are connected. 59 is a chamber with another thermocouple 38 arranged in the pipe 8. 20 is a condenser, to the lower end of which the pipe 8 is connected, 38' is a thermocouple near the upper end of the condenser 20, 40 is a galvanometer connected to the couples 38, 38' and also to the galvanometer 42, 32 is a discharge pipe, also at the upper end of the condenser, 33 is a drain pipe with an extension at its upper end, into which opens the upwardly bent end of the pipe 32, and 30 is a reservoir into which the water from the pipes 31 and 33 is delivered. 25 is a liquid heater, preferably with an insulating jacket, 24 is a burner for heating the liquid in the jacket, and 29 is a filling and expansion tank at the top of the heater 25. 21 is a siphon pipe connected to the condensate collector 53 at the base of the heat exchanger 1 at one end so as to form a liquid seal, 22 is an upwardly directed vertical reach of the siphon pipe which partly extends through the water space of the heater 25, and 23 is a downwardly directed vertical reach of the siphon pipe which partly extends through the cooler 20 and at its lower end delivers into the reservoir 30. The condensate from the collector 53 enters the left shank of the siphon pipe 21 and a corresponding amount of liquid flows from the upper end of the right shank of the siphon pipe through the inclined connection connecting the siphon to the vertical reach 22, this amount of liquid being vaporized in the knee forming the lower end of the reach 22, so that only vapor rises in the vertical reach 22 in the heater 25. The vapor is re-condensed in the reach 23 by the condenser 20, and the final condensate is delivered to the reservoir 30.

The liquid in the heater 25 is heated to a temperature which is higher than that required for the complete evaporation of the condensate. This excess temperature is required in order to evaporate all the water in the vertical reach 22 of the siphon pipe. The excess of temperature, however, is only slight and may slightly superheat the vapor at the end of the reach 22, but it will never evaporate the water in the siphon 21. The superheat is so small as compared with the evaporation heat that it will not appreciably raise the temperature in the condenser 20 and the test result will not be influenced by this negligible temperature rise. Obviously, evaporation of the water in the siphon 21 is impossible, the more so as the siphon is at such a distance from the burner 24 that there will be no heat transfer from the burner to the siphon. Normally, the water in the siphon, provided that the shanks of the siphon are long enough, will not allow gas to make its way through the siphon, but even if, by accident, a few gas bubbles make their way through the water in the siphon, this is practically without importance, as explained with reference to Fig. 1.

Test gas is admitted to the meter 19 through a pipe 34 and is delivered from the meter to the burner 2 through a pipe 35 and a pressure regulator 36. 26 is a supply pipe to the burner 24 in the liquid heater 25, which is preferably connected to a temperature regulator 27.

The temperature regulator controls the fuel supply to the burner 24 so as to heat the liquid in the heater 25 to a temperature which is somewhat higher than that required for the complete evaporation of the condensate.

The recondensation of the evaporated condensate in the condenser 20 involves an increase of temperature of the cooling fluid flowing through the condenser 20. The heat transferred to the cooling medium in the condenser 20 is measured by the thermocouples 38 and 38' connected to the galvanometer 40. The voltage of the couples 38 and 38' is opposed to the voltage of the couples 41 and 41' which measure the increase of temperature due to the combustion in the burner 2. The galvanometer 40 therefore indicates the difference between the voltages at 41, 41' and 38, 38' respectively and thereby directly the net heating value, while the galvanometer 42, which is connected only to the couples 41, 41', indicates the total heating value. The variations of the heating value occur very gradually so that the slight lag between the indications at the thermocouples 41—41' and 38—38' is without influence on the final indication of the net heating value.

Various changes may be made in the details disclosed in the foregoing specification without departing from the invention or sacrificing the advantages thereof.

I claim:—

1. A calorimeter of the liquid-flow type for ascertaining the net heating value of fuels by continuous combustion, comprising a burner, means for supplying to said burner the fuel to be tested, a heat exchanger adapted to be heated by the products of combustion from said burner, means for effecting a continuous flow of liquid through said heat exchanger, means for measuring the rise of temperature of the liquid flowing in said heat exchanger, means for collecting the condensate which separates from the products of combustion in said heat exchanger, an evaporator for continuously re-evaporating the condensate and means for conveying the condensate from said collecting means to said evaporator.

2. A calorimeter of the liquid-flow type for ascertaining the net heating value of fuels by continuous combustion, comprising a burner, means for supplying to said burner the fuel to be tested, a heat exchanger adapted to be heated by the products of combustion from said burner, means for effecting a continuous flow of liquid through said heat exchanger, means for measuring the rise of temperature of the liquid flowing in said heat exchanger, means for collecting the condensate which separates from the products of combustion in said heat exchanger, an evaporator for continuously re-evaporating the condensate, and an aspirator operated by a portion of the liquid for conveying the condensate from said collecting means to said evaporator.

3. A calorimeter of the liquid-flow type for ascertaining the net heating value of fuels by continuous combustion, comprising a burner, means for supplying to said burner the fuel to be tested, a heat exchanger adapted to be heated by the products of combustion from said burner, means for effecting a continuous flow of liquid through said heat exchanger, means for measuring the rise of temperature of the liquid flowing in said heat exchanger, means for collecting the condensate which separates from the products of combustion in said heat exchanger, an evaporator for continuously re-evaporating the condensate and means for conveying the condensate from said collecting means to said evaporator, said evaporator being arranged so as to be heated by said burner.

4. A calorimeter of the liquid-flow type for ascertaining the net heating value of fuels by continuous combustion, comprising a burner, means for supplying to said burner the fuel to be tested, a heat exchanger adapted to be heated by the products of combustion from said burner, means for effecting a continuous flow of liquid through said heat exchanger, means for measuring the rise of temperature of the liquid flowing in said heat exchanger, means for collecting the condensate which separates from the products of combustion in said heat exchanger, an evaporator for continuously re-evaporating the condensate, means for conveying the condensate from said collecting means to said evaporator, and a source of heat independent of said burner for heating said evaporator.

5. A calorimeter of the liquid-flow type for ascertaining the net heating value of fuels by continuous combustion, comprising a burner, means for supplying to said burner the fuel to be tested, a heat exchanger adapted to be heated by the products of combustion from said burner, means for effecting a continuous flow of liquid through said heat exchanger, means responsive to rise of temperature of the liquid flowing in said heat exchanger, an evaporator for continuously re-evaporating the condensate which separates from the products of combustion in said heat exchanger, a source of heat independent of said burner for heating said evaporator, a condenser, means for conducting through said condenser the liquid flowing in said heat exchanger for re-condensing the re-evaporated condensate, and means for measuring the heat liberated by such recondensation.

6. A calorimeter of the liquid-flow type for ascertaining the net heating value of fuels by continuous combustion, comprising a burner, means for supplying to said burner the fuel to be tested, a heat exchanger adapted to be heated by the products of combustion from said burner, means for effecting a continuous flow of liquid through said heat exchanger, means responsive to the rise of temperature of the liquid flowing in said heat exchanger, an evaporator for continuously re-evaporating the condensate which separates from the products of combustion in said heat exchanger, a source of heat independent of said burner for heating said evaporator, a condenser, means for conducting through said condenser the liquid flowing in said heat exchanger, means responsive to the temperature rise of the liquid flowing through said condenser, means connecting said temperature-responsive means at said heat exchanger and at said condenser, and indicating means connected to said connecting means for reading the temperature rise corresponding to the net heating value.

7. A calorimeter of the liquid-flow type for ascertaining the net heating value of fuels by continuous combustion, comprising a burner, means for supplying to said burner the fuel to be tested, a heat exchanger adapted to be heated by the products of combustion from said burner, means for effecting a continuous flow of liquid through said heat exchanger, thermocouples connected in series and responsive to the rise of temperature of the liquid flowing in said heat exchanger, an evaporator for continuously re-evaporating the condensate which separates from the products of combustion in said heat exchanger, a source of heat independent of said burner for heating said evaporator, a condenser, means for conducting through said condenser the liquid flowing from said heat exchanger, another set of thermocouples connected in series and responsive to the temperature rise of the liquid flowing through said condenser, a connection between said thermocouple which is so designed that the electromotive forces of the thermocouples at the heat exchanger and at the condenser are oppositely directed, and means connected to said couples for reading the temperature rise corresponding to the net heating value.

8. A calorimeter of the liquid flow type for ascertaining the net and total heating value of fuels by continuous combustion, comprising a burner, means for supplying to said burner the fuel to be tested, a heat exchanger adapted to be heated by the products of combustion from said burner, means for effecting a continuous flow of liquid through said heat exchanger, means for measuring the rise of temperature of the liquid flowing in said heat exchanger, an evaporator for continuously re-evaporating the condensate which separates from the products of combustion in said heat exchanger, and means for measuring the heat required for the re-evaporation independently of the measuring of the temperature rise in said heat exchanger.

9. A calorimeter of the liquid-flow type for ascertaining the net and total heat value of fuels by continuous combustion, comprising a burner, means for supplying to said burner the fuel to be tested, a heat exchanger adapted to be heated by the products of combustion from said burner, means responsive to the rise of temperature of the liquid flowing in said heat exchanger, an evaporator for continuously re-evaporating the condensate which separates from the products of combustion in said heat exchanger, a source of heat independent of said burner for heating said evaporator, and means for measuring the heat required for the re-evaporation independently of said temperature-responsive means.

10. A calorimeter of the liquid-flow type for ascertaining the net heating value of fuels by continuous combustion, comprising a burner, means for supplying to said burner the fuel to be tested, a heat exchanger adapted to be heated by the products of combustion from said burner, means for effecting a continuous flow of liquid through said heat exchanger, means for measuring the temperature rise of the liquid flowing in said heat exchanger, an evaporator for continuously re-evaporating the condensate which separates from the products of combustion in said heat exchanger, a source of heat independent of said burner for heating said evaporator, a condenser, means for conducting through said condenser the liquid flowing in said heat exchanger, automatic means for subtracting the temperature rise of the liquid flowing through said condenser from the temperature rise of the same liquid in the heat exchanger, and indicating means operatively connected to said subtracting means for reading the temperature difference.

11. A calorimeter of the liquid-flow type for ascertaining the net heating value of fuels by continuous combustion, comprising a burner, means for supplying to said burner the fuel to be tested, a heat exchanger adapted to be heated by the products of combustion from said burner, means for effecting a continuous flow of liquid through said heat exchanger, a collector for the condensate which separates from the products of combustion in said heat exchanger, means for measuring the temperature rise of the liquid flowing in said heat exchanger, an evaporator arranged at a higher level than said collector for continuously re-evaporating the condensate, and means for effecting a flow of the condensate through said evaporator.

12. A calorimeter of the liquid-flow type for ascertaining the net heating value of fuels by continuous combustion, comprising a burner, means for supplying to said burner the fuel to be tested, a heat exchanger adapted to be heated by the products of combustion from said burner, means for effecting a continuous flow of liquid through said heat exchanger, a collector for the condensate which separates from the products of combustion in said heat exchanger, means for measuring the temperature rise of the liquid flowing in said heat exchanger, an evaporator arranged at a higher level than said collector for continuously re-evaporating the condensate, and an aspirator operated by flowing liquid for effecting a flow of the condensate through said evaporator.

13. A calorimeter of the liquid-flow type for ascertaining the net heating value of fuels by continuous combustion, comprising a burner, means for supplying to said burner the fuel to be tested, a heat exchanger adapted to be heated by the products of combustion from said burner, means for effecting a continuous flow of liquid through said heat exchanger, means for collecting the condensate which separates from the products of combustion in said heat exchanger, an evaporator for continuously re-evaporating the condensate, means for conveying the condensate from said collecting means to said evaporator and indicating means responsive to the rise of temperature of the liquid flowing in said heat exchanger and operatively connected to said evaporator so as to be acted upon by the difference of the heat fed by the combustion of the fuel in said burner and of the heat required for re-evaporating the condensate in said evaporator.

HUGO JUNKERS.